United States Patent [19]

Bailey

[11] 4,190,312
[45] Feb. 26, 1980

[54] LIGHT DISPLAY MEANS

[76] Inventor: Lonnie E. Bailey, 335 Marianna, Memphis, Tenn. 38111

[21] Appl. No.: 938,805

[22] Filed: Sep. 1, 1978

[51] Int. Cl.$^2$ .............................................. G02B 27/08
[52] U.S. Cl. ...................................... 350/4.2; 40/427; 362/96
[58] Field of Search ............... 350/4.2; 353/2; 362/96, 362/208, 811; 40/406, 426, 446, 427, 431, 409, 410

[56] References Cited

U.S. PATENT DOCUMENTS

| 1,101,422 | 6/1914 | Fielding | 40/410 |
|---|---|---|---|
| 2,494,239 | 1/1950 | Grow | 350/4.2 |
| 2,591,269 | 4/1952 | Lehoczki | 362/208 |
| 2,906,169 | 9/1959 | Saffir | 350/125 |
| 3,011,392 | 12/1961 | Prochazka | 350/4.2 |
| 3,242,330 | 3/1966 | Schoffer | 40/427 |
| 3,692,382 | 9/1972 | Cloutier | 350/4.2 |
| 3,995,151 | 11/1976 | Nordeen et al. | 362/96 |

FOREIGN PATENT DOCUMENTS 835531  4/1952  Fed. Rep. of Germany ............ 350/4.2

Primary Examiner—Richard A. Wintercorn

[57] ABSTRACT

A plurality of light reflective particles are positioned within a hollow, translucent bulb-like member. A fan directs air into the bulb-like member to cause the light reflective particles to move about within the bulb-like member. Light is directed into the bulb-like member to cause the light reflective particles to reflect light as they move about thereby creating exciting visual effects.

2 Claims, 3 Drawing Figures

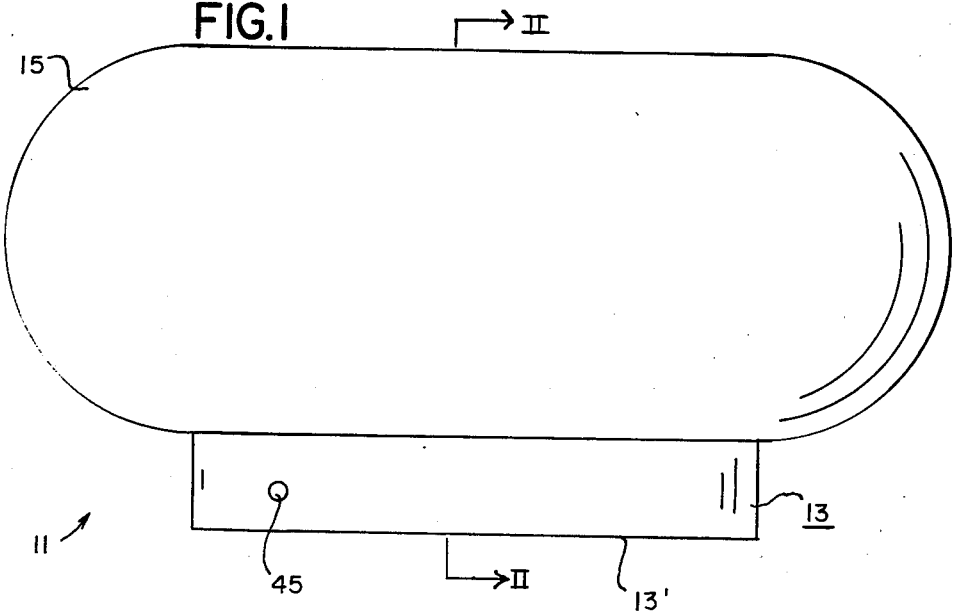
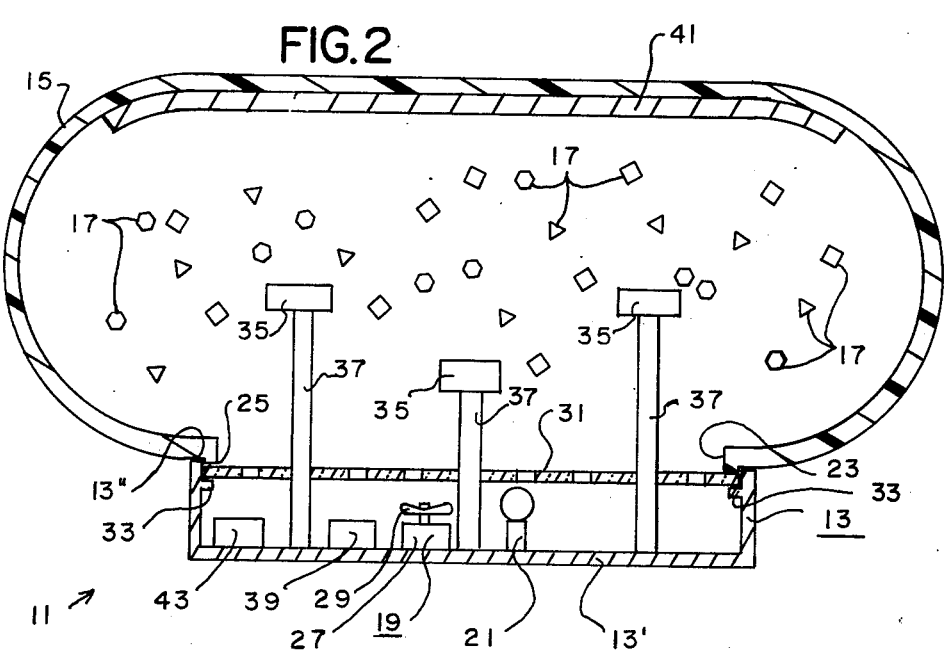

LIGHT DISPLAY MEANS

BACKGROUND OF THE INVENTION

1. Field of the Invention

This invention relates to light means for displaying exciting visual effects.

2. Description of the Prior Art

Heretofore, various light display means have been developed. See, for example, Fielding, U.S. Pat. No. 1,101,422; Lehoczki, U.S. Pat. No. 2,591,269; Saffir, U.S. Pat. No. 2,906,169; Schoffer, U.S. Pat. No. 3,242,330; Cloutier, U.S. Pat. No. 3,692,382; and Nordeen, U.S. Pat. No. 3,995,151. None of the above patents disclose or suggest the present invention.

SUMMARY OF THE INVENTION

The light display means of the present invention is directed towards providing an improved light means which displays exciting visual effects. The concept of the present invention is to position a plurality of light reflective particles within a hollow, translucent body means, direct a flow of air into the body means to cause the light reflective particles to move about with the body means, and direct light into the body means to cause the light reflective particles to reflect light as they move about.

The light display means of the present invention comprises, in general, a base means, a hollow translucent body means mounted on the base means and having an opening for communicating with the base means, a plurality of light reflective particles positioned within the body means, fan means for blowing air into the body means to cause the light reflective particles to move, and light means for directing light into the body means to cause the light relective particles to reflect light as they are moved by the fan means.

BRIEF DESCRIPTION OF THE DRAWINGS

FIG. 1 is a side elevational view of the light display means of the present invention.

FIG. 2 is a sectional view of the present invention as taken on line II—II of FIG. 1.

DESCRIPTION OF THE PREFERRED EMBODIMENT

Figure 3:
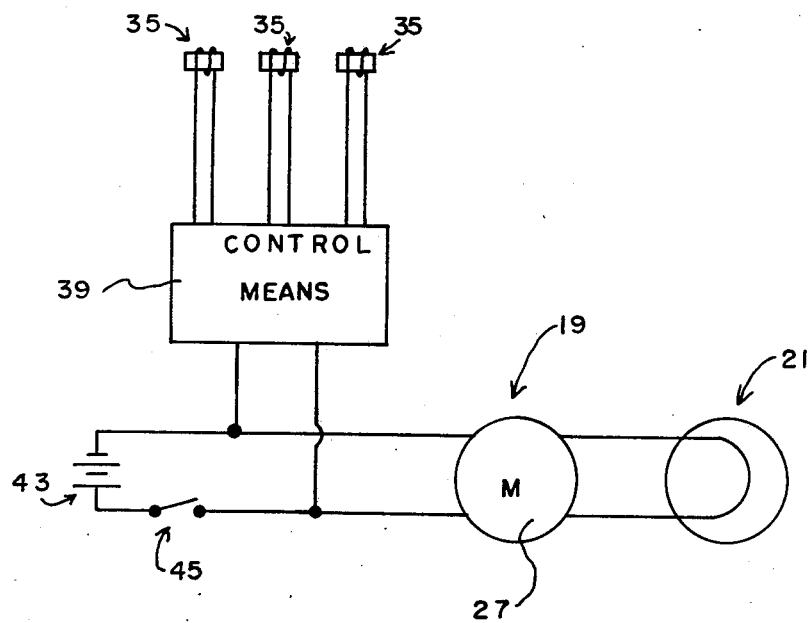
FIG. 3 is an electrical diagram of the electrical components of the light display means of the present invention.

The light display means 11 of the present invention may be constructed in various shapes and sizes for various uses. For example, the light display means 11 may be built as a table top device as shown in FIGS. 1 and 2, as a hand held wand-like device (not shown), or the like as will be apparent to those skilled in the art. In general, the light display means 11 includes a base means 13, a hollow translucent body means 15 mounted on the base means 13, a plurality of light reflective particles 17 for being positioned within the body means 15, a fan means 19 for blowing air into the body means 15 to cause the light reflective particles 17 to move about within the body means 15, and a light means 21 for directing light to the body means 15 to cause the light reflective particles 17 to reflect light as they are moved by the fan means 19.

The base means 13 is adapted to supportingly receive the body means 15, the fan means 19, and the light means 21. The base means 13 shown in FIGS. 1 and 2 is constructed in an open pan-like shape having a substantially flat bottom 13' for resting upon a supporting surface such as a table top or the like and having an open top 13". The base means 13 may be constructed of any substantially rigid material such as plastic.

The body means 15 is adapted to be positioned on the base means 13 adjacent the open top 13" thereof as clearly shown in FIGS. 1 and 2. The body means 15 has an opening 23 for communicating with the base means 13. The body means 15 shown in FIGS. 1 and 2 has a neck-like portion 25 for extending into the open top 13" of the base means 13. The body means 15 shown in FIGS. 1 and 2 is substantially bulb-like or globe-like. However, the body means 15 may be constructed in various other shapes as heretofore indicated. The body means 15 is constructed of a translucent material in substantially any color and of any substantially translucent materials such as various plastic materials known to those skilled in the art.

The plurality of light reflective particles 17 positioned within the body means 15 as clearly shown in FIG. 2 may be of any construction apparent to those skilled in the art. For example, the light reflective particles 17 may consist of small pieces of aluminum foil or the like. However, for reasons which will hereinafter become apparent the light reflective particles 17 preferably consist of small pieces of iron coated with a light reflective paint or the like.

The fan means 19 is preferably positioned within the base means 13 as shown in FIG. 2 for blowing air into the body means 15 to cause the light reflective particles to move about within the body means 15. The fan means 19 preferably includes an electric motor member 27 and a blade member 29 attached to the electric motor member 27 for being rotated thereby.

The light means 21 is preferably located in the base means 13 as clearly shown in FIG. 2 for directing light into the body means 15 to cause the light reflective particles 17 to reflect light as they are moved about by the fan means 19. The light means 21 may be of any typical construction apparent to those skilled in the art.

The light display means 11 may include a grill means 31 for being positioned between the opening 23 of the body means 15 and the base means 13 as clearly shown in FIG. 2 prevent the light reflective particles 17 from passing out of the body means 15 through the opening 23 and into the base means 13 or the like. The grill means 31 is preferably constructed of a highly transparent material so as not to block any of the light passing from the light means 21 into the body means 15. The base means 13 may include a ledger-like member 33 for supporting the grill means 31 as shown in FIG. 2. The grill means 31 may include adjustable louvers for selectively directing the flow of air therethrough to thereby vary the movement of the reflective particles 17 in the body means 15 as should be apparent to those skilled in the art. The grill means 31 and the adjustable louvers may be of material and construction known to those skilled in the art.

The light display means 11 may include electromagnetic means for selectively attracting the light reflective particles 17. The electromagnetic means preferably includes a plurality of electromagnetic members 35 positioned within the body means 15 in any manner apparent to those skilled in the art. For example, the electromagnetic members 35 may be attached to post members 37 which extend through the grill means 31 and are attached to the base means 31 as shown in FIG. 2. The post members 37 may be of varying heights as shown in FIG. 2. The electromagnetic members 35 may be of any construction known to those skilled in the art. The electromagnetic means preferably includes a control means 39 for selectively activating each of the electromagnetic members 35. More specifically, the control means 39 causes the electromagnetic members 35 to turn on and off intermittently. This could be accomplished by an RC circuit or by a cam timer device as will be apparent to those skilled in the art. Such intermittent activation of the electromagnetic members will vary the movement of the light reflective particles 17 within the body means 15 to thereby vary the visual effect of the light display means 11.

The light display means 11 may include a mirror-like reflector means 41 positioned within the body means 15 to reflect light from the light means 21 back onto the light reflective particles 17. This will give a more dynamic display of light as the light will then come from many directions rather than from just the light means 21.

The fan means 19, light means 21 and electromagnetic means may be activated by alternating or direct current electricity. For example, these components may be electrically connected to a battery 43 as shwon in FIG. 3. Additionally, the light display means 11 may have a typical plug member (not shown) for being coupled to standard household alternating current rather than utilizing the battery 43. In that case, a rectifier may be utilized to transform the alternating current into direct current of direct is desired. A switch 45 may be provided to selectively activate the light display means 11.

Although the present invention has been described and illustrated with respect to a preferred embodiment thereof, it is not to be so limited since changes and modifications may be made therein which are within the full intended scope of the invention.

I claim:
1. Light display means comprising:
   (a) base means;
   (b) hollow translucent body means for being mounted on said base means, said body means having an opening for communicating with said base means;
   (c) a plurality of magnetically attractable, light reflective particles for being positioned within said body means;
   (d) fan means for blowing air into said body means to cause said light reflective particles to move;
   (e) light means for directing light into said body means to cause said light reflective particles to reflect light as they are moved by said fan means;
   (f) grill means for being positioned between said opening of said body means and said base means to prevent said light reflective particles from passing out of said body means through said opening of said body means; and
   (g) electromagnet means for selectively attracting said light reflective particles, said electromagnet means including a plurality of electromagnet members for being positioned within said body means and for selectively attracting said light reflect particles, said electromagnet means including control means for selectively activating each of said electromagnet members.
2. The light display means of claim 1 in which said electromagnet members are powered by direct current.

* * * * *